United States Patent
Ivey

(10) Patent No.: US 11,501,756 B2
(45) Date of Patent: Nov. 15, 2022

(54) SMART SPEAKER SYSTEM

(71) Applicant: MITEK CORP., INC., Phoenix, AZ (US)

(72) Inventor: Johnathan Ivey, Chandler, AZ (US)

(*) Notice: Subject to any disclaimer, the term of this patent is extended or adjusted under 35 U.S.C. 154(b) by 0 days.

(21) Appl. No.: 16/263,559

(22) Filed: Jan. 31, 2019

(65) Prior Publication Data

US 2020/0251092 A1 Aug. 6, 2020

(51) Int. Cl.
| | |
|---|---|
| G10L 15/08 | (2006.01) |
| G08B 5/22 | (2006.01) |
| G08B 5/38 | (2006.01) |
| G10L 21/0208 | (2013.01) |
| H04W 4/90 | (2018.01) |
| G08B 3/10 | (2006.01) |

(52) U.S. Cl.
CPC ............. *G10L 15/08* (2013.01); *G08B 3/10* (2013.01); *G08B 5/223* (2013.01); *G08B 5/38* (2013.01); *G10L 21/0208* (2013.01); *H04W 4/90* (2018.02); *G10L 2015/088* (2013.01)

(58) Field of Classification Search
USPC ...................................................... 704/1–504
See application file for complete search history.

(56) References Cited

U.S. PATENT DOCUMENTS

| | | | | |
|---|---|---|---|---|
| 8,456,299 | B2* | 6/2013 | Foisy | G08B 25/012 340/539.18 |
| 8,781,442 | B1* | 7/2014 | Link, II | H04L 9/30 370/338 |
| 9,112,700 | B2* | 8/2015 | Link, II | H04L 9/3297 |
| 9,280,983 | B2* | 3/2016 | Zhang | G10L 21/0208 |
| 9,503,563 | B2* | 11/2016 | Jang | G08B 25/016 |
| 10,026,297 | B2* | 7/2018 | Klimanis | H04W 76/14 |
| 10,258,295 | B2* | 4/2019 | Fountaine | G08B 21/0423 |
| 10,325,596 | B1* | 6/2019 | Tran | G10L 15/30 |
| 10,373,481 | B2* | 8/2019 | Tannenbaum | G08B 29/185 |
| 10,409,860 | B2* | 9/2019 | Goldstein | G06F 16/635 |
| 10,498,900 | B2* | 12/2019 | Rose | H04M 3/5335 |
| 2003/0114189 | A1* | 6/2003 | Moon | H04M 1/72451 455/564 |

(Continued)

*Primary Examiner* — Marcus T Riley
(74) *Attorney, Agent, or Firm* — Keith L. Jenkins, Registered Patent Attorney LLC; Keith L. Jenkins

(57) ABSTRACT

A smart speaker system is used as an emergency notification system. The smart speaker has a loudspeaker, a microphone, a visual display, processing capability, and an emergency flasher in the same enclosure. The smart speaker is in communication with a network-connected server providing at least distribution of emergency notification messages to appropriate clients. The amount of audio processing shared between the smart speaker and the server may vary, depending on the requirements of the installation site. Once an emergency voice communication is detected in the microphone output, the system generates a confirmation message that is played over the loudspeaker. Upon detection of an appropriate voice response from the user, the system generates an emergency response message, sends it to the distribution network, and activates the visual display, loudspeaker, and emergency flasher. Noise cancellation circuitry prevents loudspeaker interference with microphone output.

20 Claims, 7 Drawing Sheets

(56) References Cited

U.S. PATENT DOCUMENTS

| | | | |
|---|---|---|---|
| 2012/0139718 A1* | 6/2012 | Foisy | G08B 25/014 340/531 |
| 2012/0214436 A1* | 8/2012 | Clark | H04W 4/90 455/404.2 |
| 2014/0294180 A1* | 10/2014 | Link, II | G08G 1/205 380/270 |
| 2014/0372401 A1* | 12/2014 | Goldstein | G06F 16/68 707/706 |
| 2015/0340049 A1* | 11/2015 | Zhang | G10L 15/20 704/227 |
| 2015/0348389 A1* | 12/2015 | Jang | H04B 1/385 455/404.1 |
| 2016/0134737 A1* | 5/2016 | Pulletikurty | G06F 1/163 715/735 |
| 2016/0234356 A1* | 8/2016 | Thomas | H04K 3/84 |
| 2016/0275961 A1* | 9/2016 | Yu | H04M 9/082 |
| 2016/0373909 A1* | 12/2016 | Rasmussen | H04W 4/80 |
| 2017/0206772 A1* | 7/2017 | Klimanis | G08B 25/007 |
| 2018/0158312 A1* | 6/2018 | Tannenbaum | G07C 9/27 |
| 2018/0325469 A1* | 11/2018 | Fountaine | H04N 21/2187 |
| 2019/0020762 A1* | 1/2019 | Rose | H04M 3/537 |
| 2020/0251092 A1* | 8/2020 | Ivey | H04W 4/90 |

\* cited by examiner

SMART SPEAKER SYSTEM

FIELD OF ART

The present invention relates to voice-responsive (smart) speaker systems. The present invention more particularly relates to facility emergency notification systems using smart speakers.

BACKGROUND OF THE INVENTION

Emergency notification systems play an important role in facility management. Many such systems rely on alarms initiated at the point of the emergency, such as pulling a fire alarm. Such point-of-problem systems do not automatically cover a broad range of possible emergencies, such as flood, medical, terrorism, chemical leakage, etc. As a result, the most efficient allocation of emergency response resources cannot always be made.

SUMMARY OF THE INVENTION

The present invention provides a voice-initiated emergency notification system from an observer of such emergency. The observer's voice into the smart speaker, which includes a microphone, identifies a location and type of emergency. A voice recognition system recognizes key words in the observer's voice message and initiates a confirmation message back to the observer. If the observer verifies the message, then the emergency voice message is sent, via an internet or intranet (network, generally), to the appropriate first responders. Emergency voice messages can relate to more than one emergency, such as "fire with injuries." Audio processing, including voice recognition, is shared between the smart speaker and the server, with the degree varying responsive to installation site requirements. Noise cancellation circuitry prevents loudspeaker interference with microphone output. The novel use of emergency confirmation messages and audible responses thereto, the multi-sensory response of the smart speaker (voice, siren, flashing light, text, symbols), the microphone noise cancellation of the loudspeaker output, and smart client selection based on the emergency notification message are points of novelty of the present invention.

DESCRIPTION OF THE FIGURES OF THE DRAWINGS

The present invention will hereinafter be described in conjunction with the following drawing figures, wherein like numerals denote like elements.

DETAILED DESCRIPTION OF THE INVENTION

Figure 1:
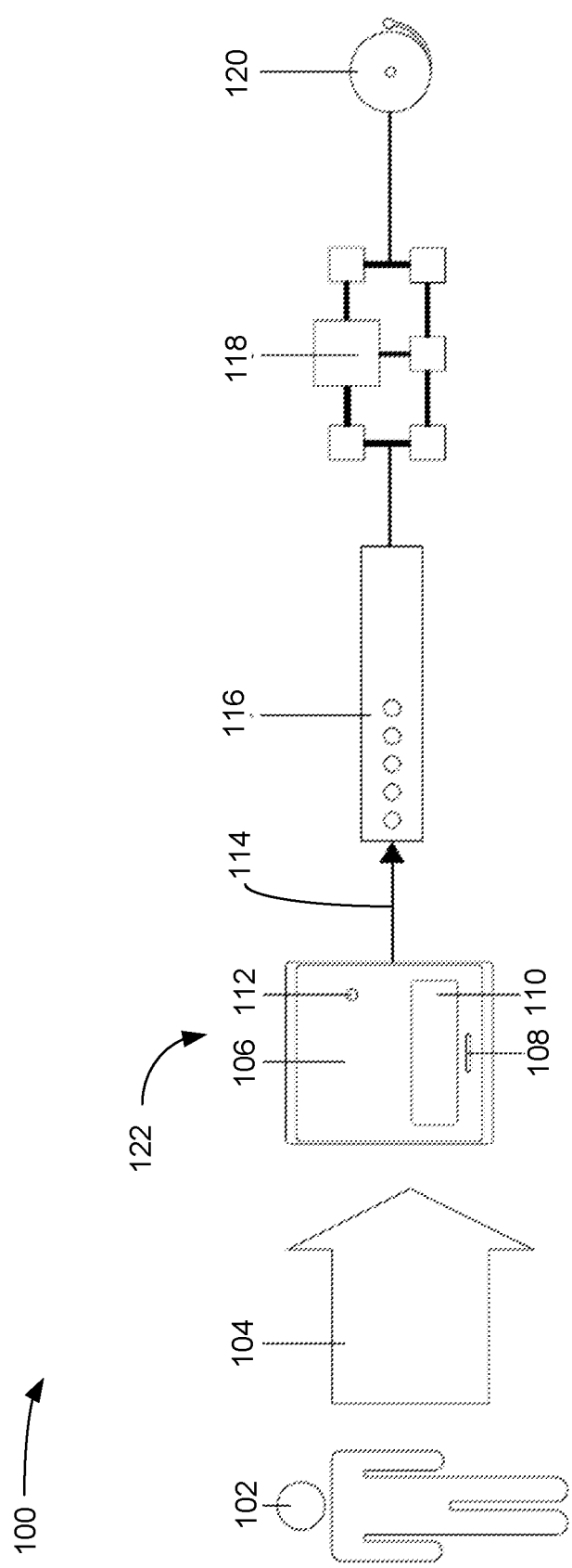
FIG. 1 is a diagrammatic view illustrating an exemplary embodiment of a smart speaker system showing a first process step, according to a preferred embodiment of the present invention.

FIG. 1 is a diagrammatic view illustrating an exemplary embodiment of a smart speaker system 100 showing a first process step, according to a preferred embodiment of the present invention. A user 102 provides a voice message input 104 to a smart speaker 122. The voice message input 104 contains an emergency keyword, an emergency type, and a location of the emergency. For example: "Globalcom I see a fire at gate 18". Where "Globalcom" is a key word indicating an emergency, "fire" is the emergency type, and "gate 18" is the emergency location.

The smart speaker system 100 includes the smart speaker 122 and the server 116 having a network 118 connection to clients 120. The smart speaker system 100 is intended for large facility installations. Typically, smart speakers 122 would be mounted in various places in the facility, much like pull-down fire alarm actuators are today. A smart speaker may also be located in a centralized security office, where emergencies may be observed by closed circuit television, or the like. Each smart speaker 122 would be connected to the server 116, either directly or via a communications network similar to network 118.

Smart speaker 122 includes a housing 106 supporting a microphone 112, a visual display 110, an emergency flasher 108, a loudspeaker 706 (see FIG. 7) and a communication link 114 to server 116. Voice message input 104 is received in microphone 112 and may be processed partially within the smart speaker 122 and partially within the server 116, as will be discussed in more detail below. The server 116 receives either the entire voice message input 104 or a parsed and reformatted version thereof. The server 116 is connected to the Internet 118 or an intranet 118 and thereby to clients 120. Clients 120 are represented as an alarm bell 120, but any of various notification devices may be substituted or added. For example, flashing lights 108, computer notifications, smart speakers 122, sirens, emergency marquee floor lights, video screens 110, and the like.

Figure 2:
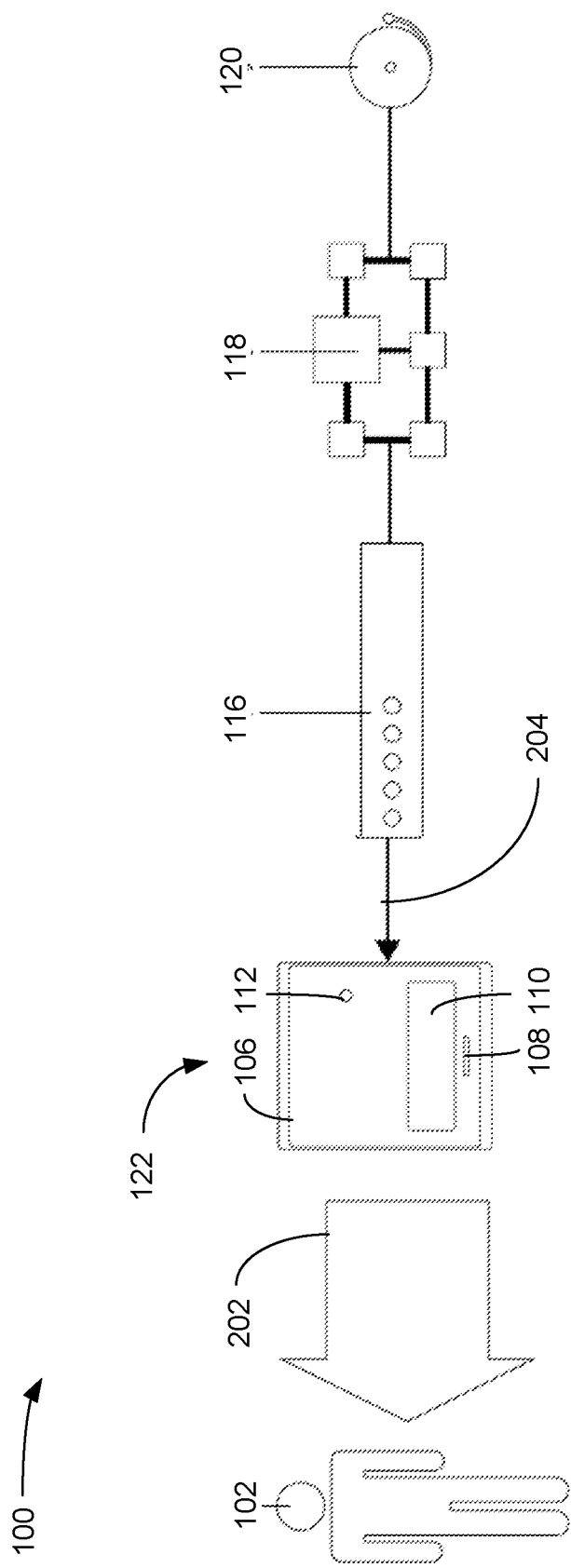
FIG. 2 is a diagrammatic view illustrating an exemplary embodiment of a smart speaker system of FIG. 1 showing a second process step, according to a preferred embodiment of the present invention.

FIG. 2 is a diagrammatic view illustrating an exemplary embodiment of a smart speaker system 100 of FIG. 1 showing a second process step, according to a preferred embodiment of the present invention. Server 116 sends 414 (see FIG. 4) a confirmation message to the smart speaker 122 via communication link 204 which, in some embodiments, may be the same as communication link 114. The confirmation message may be, for non-limiting example, "Did I hear you correctly, do you want to initiate an emergency notification?" The smart speaker 122 provides audible output 202 of the confirmation message to the user 102.

Figure 3:
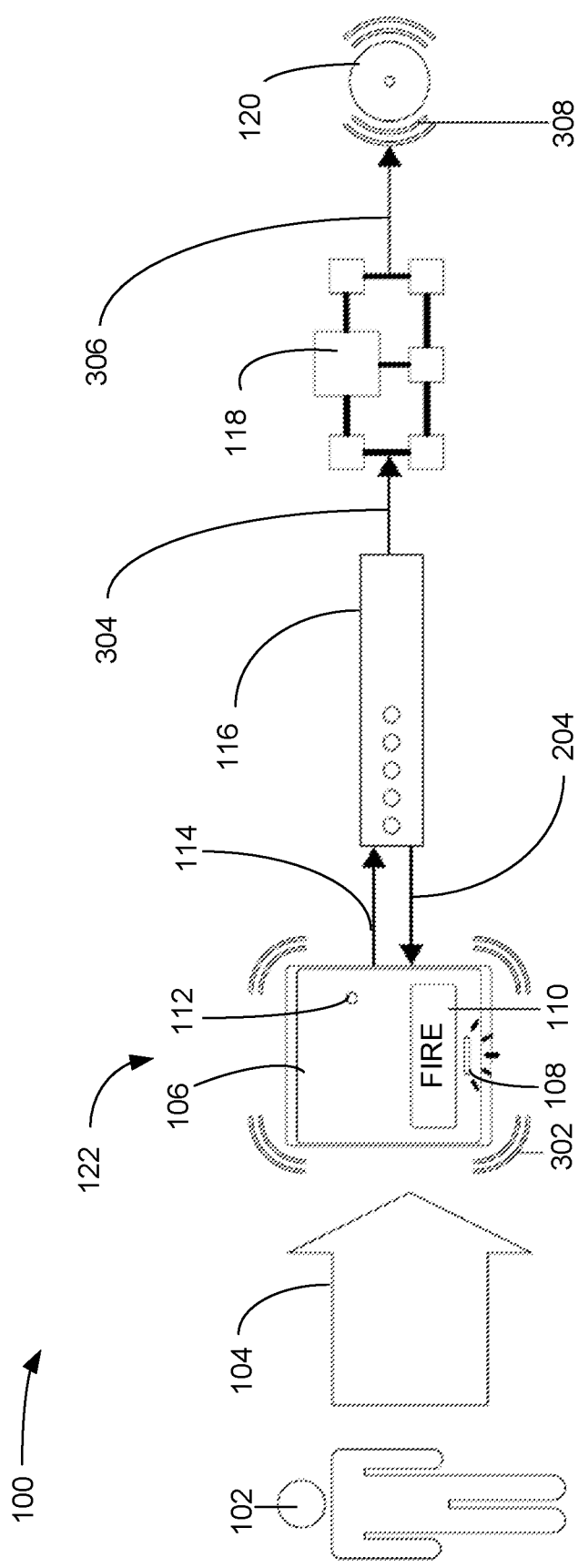
FIG. 3 is a diagrammatic view illustrating an exemplary embodiment of a smart speaker system of FIG. 1 showing a third process step, according to a preferred embodiment of the present invention.

FIG. 3 is a diagrammatic view illustrating an exemplary embodiment of a smart speaker system 100 of FIG. 1 showing a third process step, according to a preferred embodiment of the present invention. User 102 verbally confirms the confirmation message with a voice message input 104. The confirmation is processed either in the smart speaker 122 and sent 410 (see FIG. 4) to the server 116 on communication link 114 or, in other embodiments, is sent to the server 116 via link 114 and processed in the server 116. The confirmation response and original emergency message is further processed in the server 116 and emergency notifications are sent out to the smart speaker 122 on communication link 204 and to the Internet 118 on communication link 304. The Internet 118 distributes alarm messages to clients 120 via communication link 306 and the clients 120 activate their respective responses 308. The smart speaker 122 activates an audible alarm 302 through the loudspeaker 706 (see FIG. 7), the emergency flasher 108, and provides relevant alarm information on the visual display 110 as either text, symbols, or both. Preferably, the microphone 112 is connected internally to noise cancelation circuitry that nulls out the audible alarm 302, thereby enabling further voice message input 104. The smart speaker system 100 is capable of concurrently handling multiple emergencies. For example, fire and medical emergencies may arise concurrently.

Figure 4:
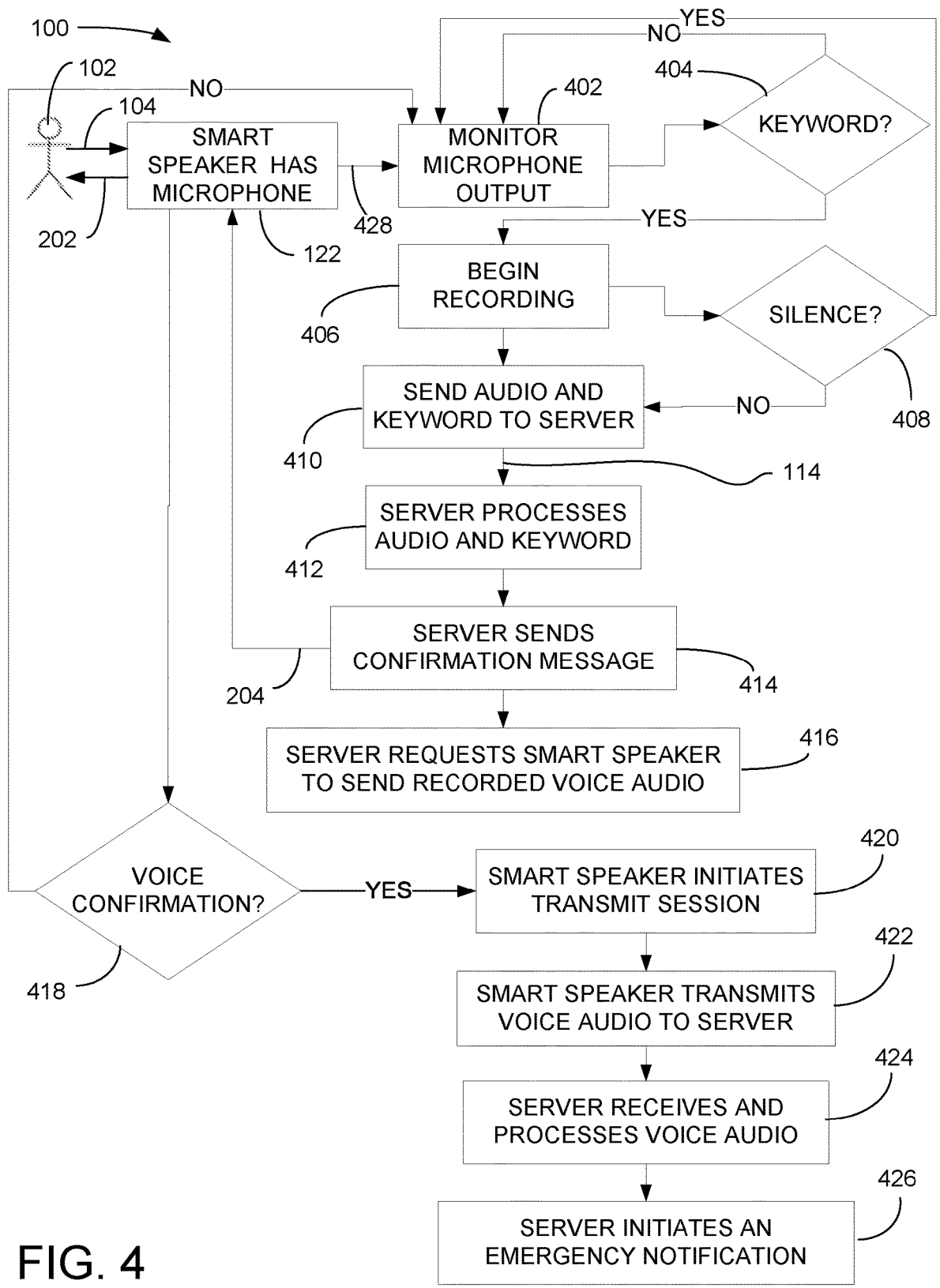
FIG. 4 is process flow chart view illustrating an exemplary embodiment of a smart speaker system of FIG. 1, according to a preferred embodiment of the present invention.

FIG. 4 is process flow chart view illustrating an exemplary embodiment of a smart speaker system 100 of FIG. 1, according to a preferred embodiment of the present invention. In this embodiment, audio processing is shared between the smart speaker 122 and the server 116. When the smart speaker system 100 is on, it constantly monitors 402 the microphone output 428 for keywords, such as the example given above: "Globalcom". The smart speaker 122 may be programmed to have a variety of keywords for a state of emergency, type of emergency, and, in some embodiments, location of emergency (such as "gate"), as well as confirmation keywords. Keywords may be provided in more than one language. A keyword database 712 (see FIG. 7) is maintained within the smart speaker system 100. If 404, no keyword is detected, the smart speaker 122 continues to monitor 402 microphone output 428. If 404 a keyword is detected, the smart speaker system 100 begins recording 406 the microphone output 428. If 408 silence ensues for a predetermined time, the smart speaker system 100 returns to monitoring 402 microphone output 428. If 408 the voice message continues, the recorded audio and keywords are sent 410 to the server 116 over communication link 114. Server 116 processes 412 the audio and keywords to produce or select an appropriate confirmation message. The server 116 then sends 414 the confirmation message to the smart speaker 122 via communication link 204. The confirmation message is then delivered audibly via audible output 202 to user 102. If 418, the user 102 does not audibly confirm the confirmation message, the smart speaker system 100 returns to monitoring 402 microphone output 428 for keywords. If 418, the user 102 does audibly confirm the confirmation message, then the smart speaker 122 initiates 420 a transmit session in response to both the voice confirmation and the server request 416. Next the smart speaker 122 transmits 422 the recorded voice audio to the server 116. The server 116 receives and processes 424 the voice audio to produce and determine the destinations for an emergency notification. Finally, the server 116 initiates 426 an emergency notification over communication link 304 to network-connected destinations and over communication link 204 to the smart speaker 122.

Figure 5:
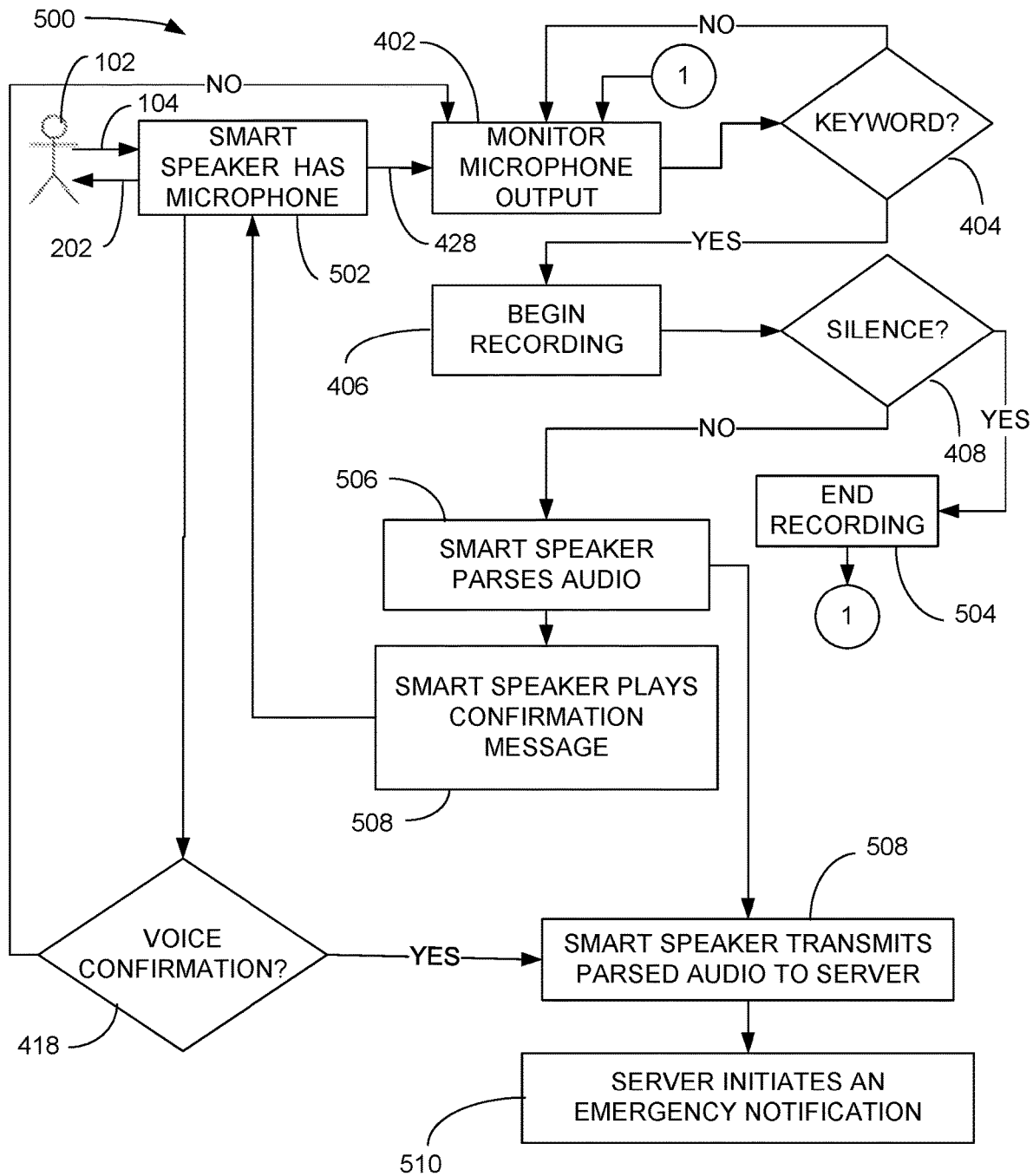
FIG. 5 is process flow chart view illustrating a second exemplary embodiment of a smart speaker system of FIG. 1, according to a preferred embodiment of the present invention.

FIG. 5 is process flow chart view illustrating a second exemplary embodiment of a smart speaker system 500, according to a preferred embodiment of the present invention. In this embodiment, the smart speaker 502 does most of the audio processing. When the smart speaker system 500 is on, it constantly monitors 402 the microphone 112 output for keywords, such as the example given above: "Globalcom". The smart speaker 502, which is a configuration of smart speaker 122, may be programmed to have a variety of keywords for a state of emergency, type of emergency, and, in some embodiments, location of emergency (such as "gate"). Keywords may be provided in more than one language. If 404, no keyword is detected, the smart speaker 502 continues to monitor 402 microphone output 428. If 404 a keyword is detected, the smart speaker system 500 begins recording 406 the voice message input 104. If 408 silence ensues for a predetermined time, the smart speaker system 500 ends 504 the recording and returns to monitoring 402 microphone output 428. If 408 the voice message continues, the smart speaker 502 parses 506 the voice message to produce or select a confirmation message. The smart speaker 502 then sends the confirmation message to the user 102 via audible output 202. If 418, the user 102 does not audibly confirm the confirmation message, the smart speaker system 500 returns to monitoring 402 microphone output 428 for keywords. If 418, the user 102 does audibly confirm the confirmation message, then the smart speaker 502 transmits 508 the parsed audio to the server 116. The server 116 initiates 510 an emergency notification by producing or selecting the emergency notification content and selecting notification clients 120 responsive the parsed audio and then transmitting the emergency notifications to the selected clients 120 over communication link 304 and to the smart speaker 502 via communication link 204.

Figure 6:
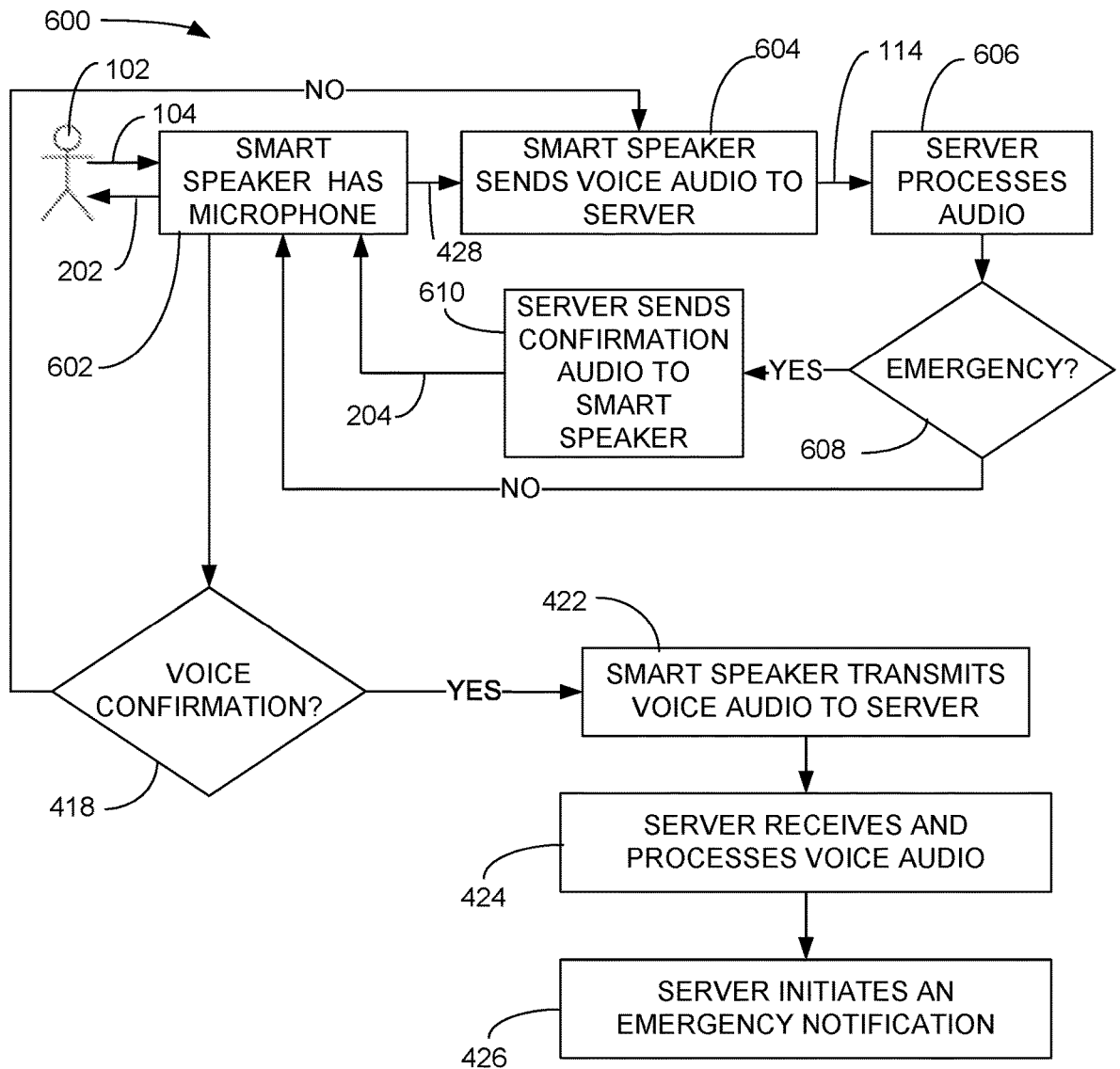
FIG. 6 is process flow chart view illustrating a third exemplary embodiment of a smart speaker system of FIG. 1, according to a preferred embodiment of the present invention.

FIG. 6 is process flow chart view illustrating a third exemplary embodiment of a smart speaker system 600 of FIG. 1, according to a preferred embodiment of the present invention. In this embodiment, the server 116 does most of the audio processing. Smart speaker 602 is a configuration of smart speaker 122. When the smart speaker system 600 is on, received voice message input 104 at the smart speaker 602 from user 102 is communicated 604 to the server 116 via communication link 114. The server 116 processes 606 the audio, including detecting keywords, parsing the audio, and producing or selecting a confirmation message responsive to the received audio. If 608 does not detect an emergency from a keyword, the smart speaker 602 continues to send 604 voice audio to the server 116. If 608 does detect an emergency from a keyword, the server 116 communicates 610 the confirmation audio to the smart speaker 602. The smart speaker 602 then communicates the confirmation message to the user 102 via audible output 202. If 418, the user 102 does not audibly confirm the confirmation message, the smart speaker system 600 returns to communicating 604 microphone output 428 to the server 116 for keyword detection. If 418, the user 102 does audibly confirm the confirmation message, then the smart speaker 602 transmits 422 the voice audio to the server 116. Server 116 receives and processes 424 the voice audio to produce an emergency notification and select destinations for the emergency notification. The server 116 then initiates 426 an emergency notification over communication link 304 and communication link 204 to the smart speaker 602.

Figure 7:
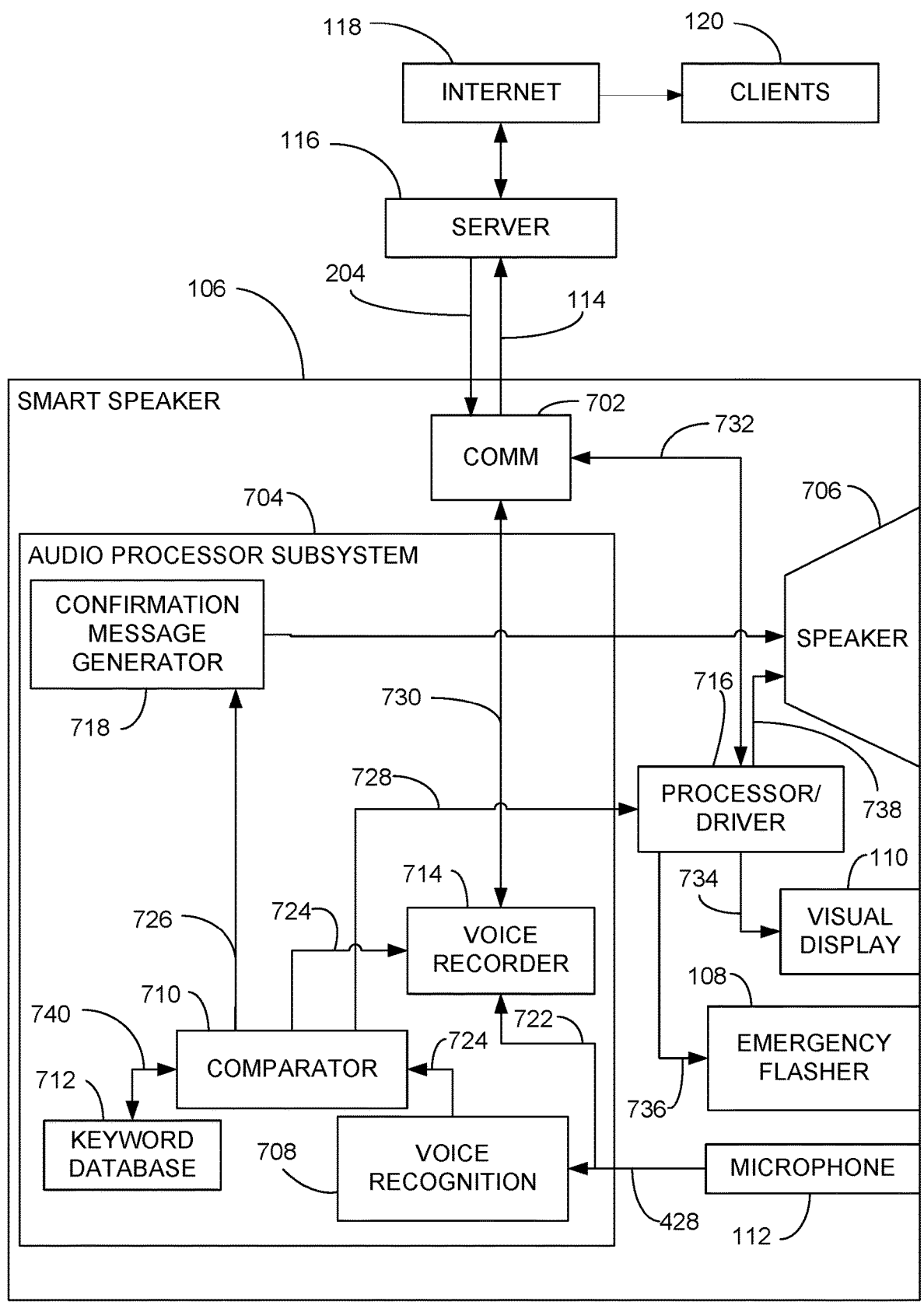
FIG. 7 is a diagrammatic view illustrating the exemplary embodiment of a smart speaker system of FIG. 1, according to a preferred embodiment of the present invention.

FIG. 7 is a diagrammatic view illustrating the exemplary embodiment of a smart speaker system 500 of FIG. 5, according to a preferred embodiment of the present invention. Smart speaker 122 includes loudspeaker 706, microphone 112, emergency flasher 108, visual display 110, a processor/driver 716, a communication module 702, and an audio processor subsystem 704. Audio processor subsystem 704 includes a voice recognition system 708, a keyword database 712, a comparator 710, a voice recorder 714, and a confirmation message generator 718. In operation, the microphone 112 output 428 is supplied to the voice recognition system 708 and made available via communication channel 722 to the voice recorder 714. The voice recognition system 708 parses the voice message input 104 into words which are supplied to the comparator 710 via communication channel 724. The comparator 710 is in communication, via communications channel 740, with the keyword database 712 and compares parsed audio with keywords in the keyword database 712. If emergency keywords are found by the comparator 710, the comparator 710 triggers the voice recorder 714 to begin recording 406 the voice audio. If comparator 710 does not receive voice audio for parsing for a predetermined amount of time, comparator 710 triggers the voice recorder 714 to stop recording. If the comparator 710 detects an emergency key word, the emergency keyword is sent, via communication channel 726, to confirmation message generator 718, which generates an appropriate confirmation message and provides audible output 202 of the confirmation message through loudspeaker 706. Confirmation messages may be predetermined or may be constructed by concatenation.

The voice recognition section 708 then parses confirmation microphone output 428 for confirmation keywords. If 418, there is no confirmation keyword within a predetermined amount of time, comparator 710 continues to monitor 402 microphone output 428. If 418 a confirmation keyword is detected, comparator 710 triggers the voice recorder 714 to send the recorded voice message to the communications module 702 over communications channel 730.

Communications module 702 communicates the recorded voice message to server 116 via communications link 114.

Comparator 710 also sends the parsed keywords to the processor/driver 716 via communications channel 728. Processor/driver 716 responds to the received keywords by generating and sending an emergency notification message to the communications module 702 via communication channel 732. Communications module 702 then sends the emergency notification message to the server 116 via communications link 114 and server 116 distributes the emergency notification message to clients 120 via the network 118. Processor/driver 716 also responds to the received keywords to drive visual display 110 over communications channel 734. Visual display 110 presents either text or symbolic representations of the type of emergency reported. Processor/driver 716 also responds to the received keywords to drive emergency flasher 108 over communications channel 736. Emergency flasher 108 may have RGB LEDs enabling flashing that is color coded to the type of emergency. In addition, the pattern, color, and intensity of flashing may correspond to the type of emergency. Processor/driver 716 also responds to the received keywords to drive loudspeaker 706 with an audio signal over communications channel 738. The loudspeaker 706 may be driven to provide various emergency-responsive audible siren-type alarms or may make linguistic announcement of the emergency notification message. In a particular embodiment, the loudspeaker 706 may carry live voice from a central security office.

Those of skill in the art, enlightened by the present disclosure, will appreciate various embodiments of a smart speaker 122 that can produce the above-mentioned outputs from the above-mentioned inputs, all of which embodiments are within the scope of the present invention. In some embodiments, for non-limiting example, processor/driver 716 may be within the audio processing subsystem 704.

Embodiments 100, 500, and 600 are preferred embodiments. A more preferred embodiment is embodiment 100 that can be reconfigured into embodiment 500 or 600 by hardware reconfiguration, such as swapping out circuit boards, changing jumper connections, flipping DIP switches, etc. The most preferred embodiment is embodiment 100 that can be configured into embodiment 500 or 600 with software installations in the smart speaker 122 and/or in the server 116.

The novel use of emergency confirmation messages and verbal responses thereto, the multi-sensory response of the smart speaker 122 (voice, siren, flashing light, text, symbols), the noise cancellation of the loudspeaker output, and smart client selection based on the emergency notification message are points of novelty of the present invention.

In the claims below, functional claiming is used and there are no statements of intended use.

I claim:

1. A smart speaker system comprising:
   a) a speaker enclosure for use proximate to a human observer tasked with reporting emergency conditions;
   b) a loudspeaker supported at least partially within said speaker enclosure;
   c) a microphone supported within said speaker enclosure;
   d) a server operable to communicate over a communication network;
   e) a communication module within said speaker enclosure and including a communication link between said speaker enclosure and said server;
   f) a visual display supported at least partially within said speaker enclosure; and
   g) an emergency flasher supported at least partially within said speaker enclosure;
   h) an audio processor subsystem within said speaker enclosure operable to parse voice audio;
   i) operability to:
      i) initially receive a voice notification via said microphone from said human observer of said emergency conditions;
      ii) parse said voice notification in said audio processor subsystem;
      iii) generate a confirmation message regarding said emergency conditions in said audio processor subsystem;
      iv) transduce said generated confirmation message into audible output via said loudspeaker back to said human observer of said emergency condition; and
      v) receive a voice confirmation from said human observer of said emergency conditions via said microphone.

2. The smart speaker system of claim 1, comprising: a keyword database of emergency keywords and confirmation keywords within said audio processor.

3. The smart speaker system of claim 2, operable to record output of said microphone in a voice recorder responsive to detection of particular said emergency keywords and responsive to said received voice confirmation.

4. The smart speaker system of claim 2, wherein said audio processor subsystem is operable to generate particular confirmation messages responsive to detection of respective particular said emergency keywords.

5. The smart speaker system of claim 3, wherein said audio processor subsystem is operable to:
   a) detect confirmation keywords in said output of said microphone;
   b) communicate said confirmation keywords to a processor/driver; and c) communicate said confirmation keywords to said communications module.

6. The smart speaker system of claim 4, wherein at least a portion of said audio processor subsystem is located in said server.

7. The smart speaker system of claim 4, wherein a processor/driver is operable, responsive to receiving communication of said confirmation keywords and said emergency keywords, to:
 a) generate an emergency notification message;
 b) communicate said emergency notification message via said server;
 c) drive said visual display responsive to reception of said emergency notification message;
 d) drive said emergency flasher responsive to reception of said emergency notification message; and
 e) drive said loudspeaker responsive to reception of said emergency notification message.

8. The smart speaker system of claim 6, wherein said server is operable to distribute said emergency notification message to appropriate clients via said communications network.

9. The smart speaker system of claim 6, wherein:
 a) said visual display is operable to display at least one of text and symbolic images;
 b) said emergency flasher is controllable to modulate intensity, color, and flash pattern, responsive to a type of emergency represented by said emergency notification message;
 c) said loudspeaker is operable to audibly present at least one emergency notification message and an alarm sound.

10. The smart speaker system of claim 2, comprising noise cancellation circuitry operable to cancel only loudspeaker output a microphone output.

11. A smart speaker system comprising:
 a) a speaker enclosure for use proximate to a human observer tasked with reporting emergency conditions;
 b) a loudspeaker supported at least partially within said speaker enclosure;
 c) a microphone supported within said speaker enclosure;
 d) a server operable to communicate over a communication network;
 e) a communication module within said speaker enclosure including a communication link from said speaker enclosure to said server;
 f) a visual display supported at least partially within said speaker enclosure; and
 g) an emergency flasher supported at least partially within said speaker_enclosure; and
 h) an audio processor subsystem within said speaker enclosure operable to parse voice audio;
 i) a comparator within said audio processor subsystem;
 j) a keyword database of emergency keywords and confirmation keywords within said audio processor; subsystem and
 k) operability to:
  i) receive a voice notification via said microphone from said human observer of said emergency conditions;
  ii) parse said voice notification in said audio processor subsystem;
  iii) generate a confirmation message regarding said emergency condition in said audio processor;
  iv) transduce said generated confirmation message into audible output via said loudspeaker back to said observer of said emergency condition; and
  v) receive a voice confirmation from said human observer of said emergency condition via said microphone.

12. The smart speaker system of claim 11, comprising said audio processor subsystem operable to:
 a) detect, via said comparator, emergency key words present in said emergency keyword database, in an output of said microphone;
 b) generate particular confirmation messages responsive to detection of respective particular said emergency keywords;
 c) send an audio signal of said confirmation message to said loudspeaker;
 d) detect, via said comparator, confirmation keywords in said output of said microphone; and
 e) communicate said confirmation keywords to a processor/driver.

13. The smart speaker system of claim 11, wherein said audio processor subsystem comprises at least one of audio processing hardware and audio processing software located in said speaker enclosure.

14. The smart speaker system of claim 12, wherein said processor/driver is operable, responsive to receiving communication of said confirmation keywords and said emergency keywords, to:
 a) generate an emergency notification message;
 b) communicate said emergency notification message via said server;
 c) drive said visual display responsive to reception of said emergency notification message;
 d) drive said emergency flasher responsive to reception of said emergency notification message; and
 e) drive said loudspeaker responsive to reception of said emergency notification message.

15. The smart speaker system of claim 13, wherein said server is operable to distribute said emergency notification message to appropriate clients via said communications network.

16. The smart speaker system of claim 13, wherein:
 a) said visual display is operable to display at least one of text and symbolic images;
 b) said emergency flasher is controllable to modulate intensity, color, and flash pattern, responsive to a type of emergency represented by said emergency notification message;
 c) said loudspeaker is operable to audibly present at least one of an emergency notification message a voice response, and an alarm sound.

17. The smart speaker system of claim 11, comprising noise cancellation circuitry operable to cancel only loudspeaker output a microphone output.

18. A smart speaker system comprising:
 a) a speaker enclosure for use proximate to a human observer tasked with reporting emergency conditions;
 b) a loudspeaker supported at least partially within said speaker enclosure;
 c) a microphone supported within said speaker enclosure;
 d) a server operable to communicate over a communication network;
 e) a communication module including a communication link between said speaker enclosure and said server;
 f) a visual display supported at least partially within said speaker enclosure;
 g) an emergency flasher supported at least partially within said speaker enclosure;

h) a keyword database of emergency keywords and confirmation keywords within an audio processor subsystem within said speaker enclosure;
i) noise cancellation circuitry operable to cancel loudspeaker output a microphone output; and
j) at least one of audio processing hardware and audio processing software located in:
  i) said speaker enclosure; and
  ii) said server;
k) wherein an audio processor subsystem within said speaker enclosure is operable to parse voice audio;
l) operability to:
  i) initially receive a voice notification via said microphone from said human observer of said emergency conditions;
  ii) parse said voice notification in said audio processor subsystem;
  iii) detect emergency key words, present in said emergency keyword database, in an output of said microphone;
  iv) generate a confirmation message regarding said emergency conditions in said audio processor subsystem responsive to detection of particular said emergency keywords;
  v) transduce said generated confirmation message into audible output via said loudspeaker back to said human observer of said emergency conditions;
  vi) receive a voice confirmation from said human observer of said emergency conditions via said microphone;
  vii) detect confirmation keywords in said output of said microphone;
  viii) communicate said confirmation keywords to a processor/driver; and
  ix) communicate said confirmation keywords to said communication module.

19. The smart speaker system of claim 18, wherein said processor/driver is operable, responsive to receiving communication of said confirmation keyword and said emergency keywords, to:
  a) generate an emergency notification message;
  b) communicate said emergency notification message via said server;
  c) drive said visual display responsive to reception of said emergency notification message;
  d) drive said emergency flasher responsive to reception of said emergency notification message; and
  e) drive said loudspeaker responsive to reception of said emergency notification message.

20. The smart speaker system of claim 19, wherein said server is operable to:
  a) determine appropriate clients to receive said emergency notification message; and
  b) distribute said emergency notification message to said appropriate clients via said communications network.

* * * * *